B. E. M. WATSON.
WIND SHIELD VENTILATOR.
APPLICATION FILED SEPT. 19, 1916.
1,248,218.  Patented Nov. 27, 1917.
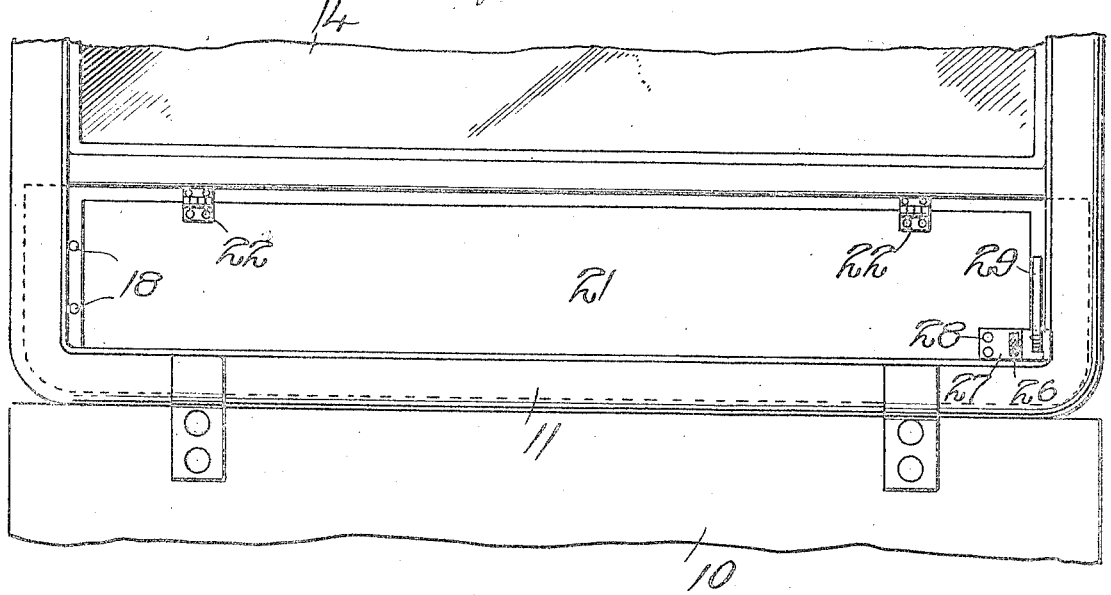
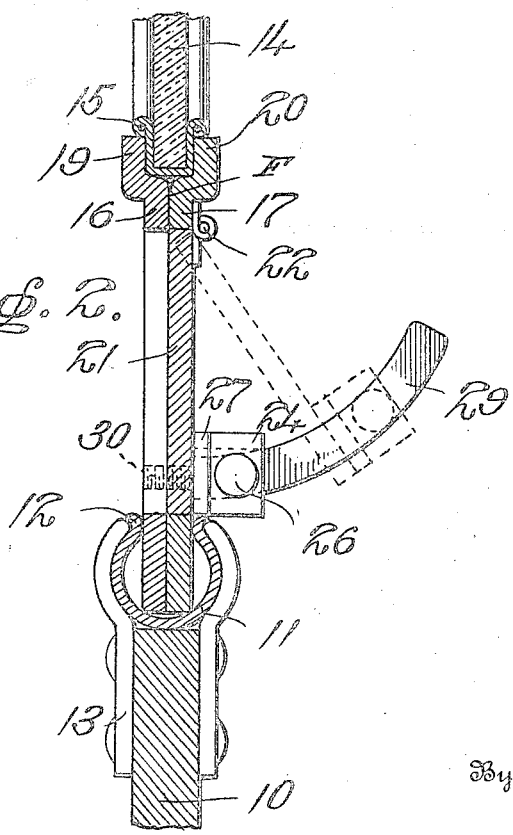
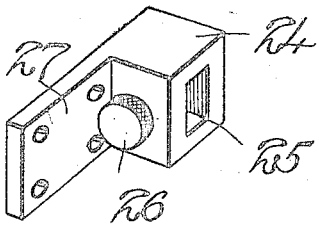
B. E. M. Watson, Inventor

UNITED STATES PATENT OFFICE.

BERT E. M. WATSON, OF GRAND ISLAND, NEBRASKA.

WIND-SHIELD VENTILATOR.

1,248,218.

Specification of Letters Patent.    Patented Nov. 27, 1917.

Application filed September 19, 1916. Serial No. 121,002.

*To all whom it may concern:*

Be it known that I, BERT E. M. WATSON, a citizen of the United States, and resident of Grand Island, in the county of Hall and State of Nebraska, have invented certain new and useful Improvements in Wind-Shield Ventilators, of which the following is a specification.

The present invention relates to wind shields for motor vehicles and has particular reference to new and useful improvements in ventilating attachments therefor.

The primary object of my invention is to provide a ventilator for detachable association with a standard wind shield for admitting air behind the cowl of an automobile or the like.

Another object of my invention is to provide a removable frame having an opaque hinged section, said frame being adapted for detachable association with a standard wind shield at the base thereof to admit air behind the cowl of a motor vehicle so as to render the driver's position more comfortable in hot weather.

A further object of my invention is to provide a device of the class described having means for adjusting the same to various angles permitting more or less air to enter, the device being simple in construction, strong and durable, cheap to manufacture and install.

Other objects and advantages to be derived from the use of my improved wind shield ventilator will appear from the following detailed description and the claims, taken with an inspection of the accompanying drawing, in which:—

Figure 1 is a rear elevational view of a wind shield showing my improved ventilator applied thereto;

Fig. 2 is a vertical sectional view through the same; and

Fig. 3 is an enlarged detail of the adjusting block.

Referring more particularly to the drawing, wherein similar characters of reference designate like and corresponding parts throughout the various views, 10 designates the dash-board of a motor vehicle and 11 the usual wind shield frame, the same being usually constructed of tubular material provided with an open inner portion 12. A plurality of lugs 13 carried by the dash-board 10 embrace the bottom portion of the frame 11 to secure the same thereon.

The frame 11 carries a transparent section 14 formed of glass or the like, the same being carried in a metal sash 15 of the usual construction. The transparent section 14 terminates short of the bottom portion of the wind shield frame to permit insertion of the attachment of my invention to be described in detail hereinafter.

Referring to the ventilating device of my invention I provide a frame designated F in its entirety, said frame being formed of two sections 16 and 17 riveted or otherwise secured to each other as at 18. The upper marginal edges of the sections 16 and 17 are offset to provide spaced flanges 19 and 20, said flanges embracing the lower portion of the sash 15.

The frame F carries a door 21 formed preferably of sheet metal, said door being connected to the frame by means of hinges 22.

In order to maintain the door at desired angles to admit more or less air, I provide an adjustment block 24 having a slightly curved rectangular opening 25 therethrough, a thumb screw 26 being carried by the block and movable into the opening. A lug portion 27 is formed on the block, said lug portion being riveted or otherwise permanently secured as at 28 to the door 21. An arcuate arm 29 provided with a threaded end portion 30 is carried by the frame F, said arm having the threaded portion thereof in engagement with the frame, the curved portion of the arm passing through the rectangular opening 25 in the block 24. In this manner the door 21 may be moved from closed to open position and locked at various angles so as to control the amount of air admitted behind the cowl of the motor vehicle.

It will be seen that in applying my improved ventilator it is unnecessary to materially alter the structure of the standard wind shield, merely a portion of the pane being removed and my improved ventilator substituted. Thus it will be seen that no expensive structural alteration is necessary in the usual form of wind shield to apply my improved ventilator thereto.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. In a device of the character described the combination with a main frame, a sash for retaining a transparent section, of a supplemental frame detachably associated with the main frame including a pair of sections secured to each other, the upper marginal edges of the sections being offset, flanges formed by the offset portions adapted to embrace the lower portion of the sash, a ventilating door hingedly connected to the frame, means for adjusting the door at the desired angle comprising an arcuate shaped arm, one end of the arm being threaded for engagement with the frame, a bracket having an opening concentrically thereof adapted to receive the arm, and a thumb screw associated with the bracket adapted to engage the arm for a purpose specified.

2. In a device of the character described the combination with a main frame, a sash for retaining a transparent section, of a supplemental frame detachably associated with the main frame including a pair of sections secured to each other, the upper marginal edges of the sections being offset, flanges formed by the offset portions adapted to embrace the lower portion of the sash, a ventilating door hingedly connected to the frame, means for adjusting the door at the desired angle comprising an arcuate shaped arm, one end of the arm being threaded for engagement with the frame, a block having an opening therein to receive said arm, a lug portion extending from the block adapted to be secured to the door, and a thumb screw carried by the block and movable into the opening for a purpose specified.

In testimony whereof, I affix my signature hereto.

BERT E. M. WATSON.